United States Patent [19]

Patarin

[11] Patent Number: 6,111,952
[45] Date of Patent: Aug. 29, 2000

[54] ASYMMETRICAL CRYPTOGRAPHIC COMMUNICATION METHOD AND PORTABLE OBJECT THEREFORE

[75] Inventor: Jacques Patarin, Viroflay, France

[73] Assignee: Bull CP8, France

[21] Appl. No.: 08/913,932

[22] PCT Filed: Jan. 24, 1997

[86] PCT No.: PCT/FR97/00139

§ 371 Date: Sep. 25, 1997

§ 102(e) Date: Sep. 25, 1997

[87] PCT Pub. No.: WO97/27688

PCT Pub. Date: Jul. 31, 1997

[30] Foreign Application Priority Data

Jan. 26, 1996 [FR] France ................................ 96 00958

[51] Int. Cl.$^7$ .................................................. H04L 9/00
[52] U.S. Cl. ................................ 380/45; 380/28; 380/45; 380/259; 380/285
[58] Field of Search ................................ 380/28, 259, 45, 380/285, 59

[56] References Cited

U.S. PATENT DOCUMENTS

| | | | |
|---|---|---|---|
| 5,263,085 | 11/1993 | Shamir | 380/30 |
| 5,375,170 | 12/1994 | Shamir | 380/30 |
| 5,740,250 | 4/1998 | Moh | 380/28 |
| 5,790,675 | 8/1998 | Patarin | 380/23 |

OTHER PUBLICATIONS

Advances In Cryptology—Eurocrypt '88. Workshop On The Theory And Application Of Cryptographic Techniques. Proceedings, Davos, Switzerland, May 25–27, 1988, ISBN 3–540–50251–3. 1988, Berlin, West Germany, Springer–Verlag, West Germany, pp. 419–453, XP000568374 Matsumoto T Et Al: "Public quadratic polynomial–tuples for efficient signature–verification and message–encryption" cited in the application, see p. 419, line 1–p. 423, line 12.

Advances In Cryptology—Crypto '95. 15th Annual International Cryptology Conference. Proceedings, Proceedings of Crypto '95: 15th Annual Crypto Conference Santa Barbara, CA, USA, Aug. 27–31, 1995, ISBN 3–540–60221–6 1995, Berlin, Germany, Springer–Verlag, Germany, pp. 248–261, XPOOO605562, Patarin J: "Cryptanalysis Of The Matsumoto And Imai Public Key Scheme Of Eurocrypt '88" cited in the application, see p. 248, line 1–p. 250, last line.

*Primary Examiner*—Tod R. Swann
*Assistant Examiner*—Paul E. Callahan
*Attorney, Agent, or Firm*—Miles & Stockbridge P.C.; Edward J. Kondracki

[57] ABSTRACT

The invention relates to an asymmetric cryptographic communication process which establishes a correspondence between a first value (x) represented by n elements ($x_1, \ldots, x_n$) of a ring (A) and a second value (y) represented by m elements ($y_1, \ldots, y_m$) of this ring, n and m being integers greater than or equal to 2. The said correspondence is defined by multi variable public polynomials ($P_i$) of $A^{n+m+k} \to A$, with a low total degree, such that there are equations of the type $P_i(x_1, \ldots, x_n; y_1, \ldots, y_m; z_1, \ldots, z_k)=0$, where($z_1, \ldots, z_k$) are possible intermediate variables and k is an integer. At least the majority of the polynomials ($P_i$) do not have the form $T_i(y_1, \ldots, y_m)=S_i(x_1, \ldots, x_n)$, where the $S_i$s would be polynomials with a total degree of 2 and the $T_i$s would be polynomials with a total degree of 1.

12 Claims, 1 Drawing Sheet

ASYMMETRICAL CRYPTOGRAPHIC COMMUNICATION METHOD AND PORTABLE OBJECT THEREFORE

BACKGROUND OF THE INVENTION

Field of the Invention

The invention relates to an asymmetric cryptographic communication process for processing messages and protecting communications between interlocutors. It can be used to encrypt messages in an asymmetric way, or to sign them in an equally asymmetric way. It can also be used in asymmetric authentication.

SUMMARY OF THE INVENTION

This process uses two novel families of algorithms that are called "Dragon" and "Chains". These two families can also be combined.

What makes these new algorithms particularly advantageous is that some of them are:

1. easily used in low-power chip cards;
2. "ONE-WAY TRAPDOOR" bijections, that is, bijections that are public key encryption functions;
3. furthermore, bijections on very short variables (of 64 or 128 bits, for example).

These "Dragon" and "Chains" algorithms can be seen as a subtle and effective "fix" of an algorithm invented in 1988 by MATSUMOTO and IMAI (Tsutomu Matsumoto and Hideki Imai, "Public quadratic polynomial-tuples for efficient signature-verification and message-encryption", Advances In Cryptology, Eurocrypt '88 (Christoph G. Gunther, ed.), Lecture Notes in Computer Science, Vol. 330, Springer-Verlag, 1988, pp. 419–453). This algorithm was cracked in 1995 by Jacques PATARIN (the attack was published at the CRYPTO '95 congress, Springer-Verlag, pp. 248–261).

For this reason, the invention relates to an asymmetric cryptographic communication process which establishes a correspondence between a first value (x) represented by n elements ($x_1, \ldots, x_n$) of a ring (A) and a second value (y) represented by m elements ($y_1, \ldots, y_m$) of this ring, n and m being integers greater than or equal to 2, characterized in that:

this correspondence is defined by multivariable public polynomials ($P_i$) of $A^{n+m+k} \rightarrow A$, with a low total degree, such that there are equations of the type ($P_i(x_1, \ldots, x_n;$ $y_1, \ldots, y_m; z_1, \ldots, z_k)=0$ where ($z_1, \ldots z_k$) are possible intermediate variables and k is an integer;

at least the majority of the polynomials ($P_i$) are not in the form $T_i(y_1, \ldots, y_m)=S_i(x_1, \ldots, x_n)$, where the $S_i$s would be polynomials with a total degree of 2 and the $T_i$s would be polynomials with a total degree of 1.

The invention also relates to an associated portable object, specifically a portable object which does not store the multivariable public polynomials ($P_i$).

The concept of a "value x" to be transformed according to the process of the invention designates, as appropriate, either a message (for example when the process is used in encryption) or more generally a magnitude from which a verification is intended to be executed (for example when the process is used in signature verification or authentication).

The concept of "low degree" mentioned below must be understood to designate a degree less than or equal to 6, preferably less than or equal to 4, but at the same time greater than or equal to 2.

BRIEF DESCRIPTION OF THE DRAWINGS

Other details and advantages of the invention will become apparent from the following description of certain preferred but non-limiting embodiments with reference to the appended drawings, in which.

DETAILED DESCRIPTION OF THE PREFERRED EMBODIMENTS

2. "Dragon" Algorithm 2.1 The basic concept of "Dragons".

The name "Dragons" has been given to a first family of algorithms based on the invention. The basic concept that distinguishes the two families of algorithms "Dragon" and "Matsumoto-Imai" will now be presented. Then, in the subsequent paragraphs, certain particularly advantageous examples of "Dragons" will be shown. Finally, another family of algorithms based on the invention, which are called "Chains", will be described.

For Matsumoto-Imai

The public form exists in the form of n multivariable polynomials in a finite field K, giving an image value y constituted by a plurality of elementary image values $y_1, \ldots, y_n$ as a function of a value x constituted by a plurality of elementary values $x_1, \ldots, x_n$ in the form:

$$y_1 = P_1(x_1, \ldots, x_n)$$
$$y_2 = P_2(x_1, \ldots, x_n)$$
$$\vdots \qquad \vdots$$
$$y_n = P_n(x_1, \ldots, x_n)$$

where $P_1, P_2, \ldots, P_n$ are polynomials of $K[x_1, \ldots, x_n]$, that is, polynomials of $K^n \rightarrow K$, these polynomials having a total degree of 2.

For the Dragons

The public form exists in the form of X multivariable polynomials in a field K (or a ring), in which the variables $y_1, Y_2, \ldots, y_m$ and $x_1, x_2, \ldots, x_n$ of K occur in the form:

$$P_1(x_1, x_2, \ldots, x_n, y_1, y_2, \ldots, y_m) = 0$$
$$P_2(x_1, x_2, \ldots, x_n, y_1, y_2, \ldots, y_m) = 0$$
$$\vdots \qquad \vdots$$
$$P_\lambda(x_1, x_2, \ldots, x_n, y_1, y_2, \ldots, y_m) = 0$$

where $P_1, P_2, \ldots, P_\lambda$ are polynomials of $K^n \times K^m \rightarrow K$, with a low total degree (for example 2).

Thus, the fundamental difference between the Dragons and the MATSUMOTO-IMAI algorithms resides in the fact that, in the public form, the variables $x_i$ and $y_j$ have been "mixed".

2.2 First example: the "Small Dragon".

To begin with, a first, fairly simple example of a "Dragon algorithm" will now be presented. This example clearly illustrates the concept of Dragon algorithms, but unfortunately this algorithm is not very secure cryptographically, as indicated by the author in the article "Asymmetric Cryptography with a Hidden Monomial" (LNCS 1109, Crypto '96, Springer, pages 45 through 60). Then, in paragraphs 2.3, 2.4, 2.5 and 2.6, other examples of Dragon algorithms, for which no general attack is presently known, will be shown.

In this case, $\lambda=m=n$, and K is a small finite field (for example, $K=F_2$, the field with two elements). The number of elements of K is notated $q=|K|$.

Figure 1:
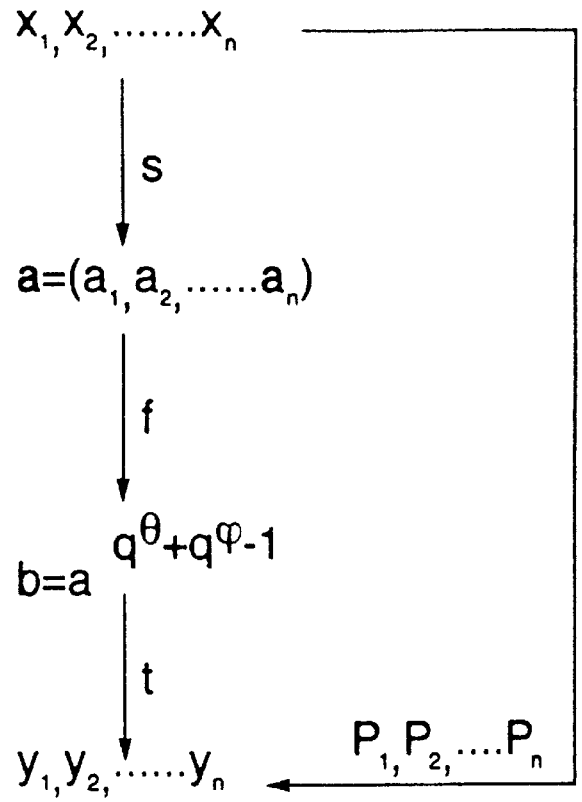
FIG. 1 is a diagram illustrating the concatenation of the transformations used to process a message, according to a first variant of the process of the invention, used in encryption.

If $x=(x_1, \ldots, x_n)$ is a value constituted in this example by an unencrypted message, and $y=(y_1, \ldots, y_n)$, the corresponding encrypted message, the passage from $x_1, \ldots, x_n$ to $y_1, \ldots, y_n$ can be calculated as represented in FIG. 1:

1) A first secret affine bijective transformation s is applied to $x=(x_1, \ldots, x_n)$, thus obtaining an image $a=s(x)=(a_1, \ldots, a_n)$.
2) A public or secret transformation f is applied to (a), resulting in an image $b=f(a)=a^{q^\theta+q^\phi-1}$ where $\theta$ and $\phi$ are public or secret integers such that $h=q^\theta+q^\phi-1$ is prime with respect to $q^n-1$, and where one is in a position to raise the power to h in a representative of the field (generally notated $F_qn$) with $q^n$ elements.
3) Finally, $b=(b_1, \ldots, b_n)$ is transformed into $y=(y_1, \ldots, y_n)$ by applying to b a second secret affine bijective transformation t such that $y=t(b)$.

All of these operations being invertible, it is also possible to calculate $(x_1, \ldots, x_n)$ from $(y_1, \ldots, y_n)$ if the secrets t and s are known. For example, $b=a^h$ will be inverted by $a=b^{h'}$, where h' is an integer such that $h.h'=1$ modulo $q_n-1$, where (.) is the symbol of the multiplication operation.

Moreover, since $b=a^{q^\theta+q^\phi-1}$, it can be deduced that $b.a=a^{q^\theta+q^\phi}$, and therefore that in a base where $a=(a_1, \ldots, a_n)$ and $b=(b_1, \ldots, b_n)$, there are n equations with the form:

$$\Sigma\Sigma\gamma_{ij}.b_i.a_j=\Sigma\Sigma\delta_{ij}.a_i.a_j \qquad (1)$$

Therefore, by expressing the $b_i$s as a function of the $y_i$s, and the $a_i$s as a function of the $x_i$s it is possible to determine that there are n equations with the form:

$$\Sigma\Sigma\mu_{ij}y_i.x_j=\Sigma\Sigma\nu_{ij}x_i.x_j+\Sigma\beta_i y_i+\Sigma\alpha_i x_i+\delta_0 \qquad (2)$$

that is, n equations with the form:

$$P_i(x_1, \ldots, x_n, y_1, \ldots, y_n)=0, i=1 \ldots n,$$

where $P_i$ is a polynomial of $K^{2n} \rightarrow K$, with a total degree of 2.

These n equations $P_i$ are made public. They constitute the public key.

In effect, anyone can use them to encrypt a message, that is to calculate $y_1, \ldots, y_n$ from $x_1, \ldots, x_n$, without knowing any secrets, in the following way. By replacing $x_1, \ldots, x_n$ by their values and by transferring these values into the equations (2), n equations with a degree of 1 are obtained in the $y_i$s.

All of the solutions of these n equations are easily obtained by GAUSS reduction. If $a \neq 0$ (which is always the case except for an exceptional x), there is only one solution in b of $b.a=a^{q^\theta+q^\phi}$, therefore there is only one solution after a GAUSS reduction: this will be the encrypted message $(y_1, \ldots, y_n)$ to be sent.

The small Dragon in signature.

It is easy to use the Small Dragon algorithm in signature: for example, if $y_1, \ldots, y_n$ is either the message to be signed or a "hash" of the message to be signed (that is, the result of a hash function applied to the message), or a public function of the message to be signed, then $x_1, \ldots, x_n$ will be the signature.

And the signature is verified by verifying that:

$$\forall i, 1 \leq i \leq n, P_i(x_1, \ldots, x_n, y_1, \ldots, y_n)=0$$

that is, by verifying that all of the public equations (2) are satisfied.

2.3 More general examples of Dragons, with a "monomial" transformation.

In this case, $\lambda=m=n$, and K is a small finite field (for example $K=F_2$, the field with two elements). The number of elements of K is notated $q=|K|$.

If $x=(x_1, \ldots, x_n)$ is a value constituted in this example by an unencrypted message, and $y=(y_1, \ldots, y_n)$, is the corresponding encrypted message, the passage from $x_1, \ldots, x_n$ to $y_1, \ldots y_n$ can be calculated as follows, if one has the secrets (the way to calculate it from x without the secrets will be shown later):

1) A first secret affine bijective transformation s is applied to $x=(x_1, \ldots, x_n)$, thus obtaining an image $a=s(x)=(a_1, \ldots, a_n)$.
2) A public or secret transformation f is applied to (a), resulting in an image $b=f(a)$ such that:

$$a\hat{}(q^\theta+q^\phi).M(b)=a\hat{}(q^\zeta+q^\xi).N(b) \qquad (1)$$

where $\theta, \phi$ and $\zeta, \xi$ are public or secret integers such that $h=q^\theta+q^\phi-q^\zeta-q^\xi$ are prime with respect to $q^n-1$, and where one is in a position to raise the power in a representative of the field (generally notated $F_qn$) with $q^n$ elements, and where M and N are secret or public affine functions. (m and n are secret a priori, but if they are public, they must be chosen very carefully in order to prevent certain attacks.) The symbol (^) represents the power function.

How is b calculated from a? It will now be shown that this is always possible using a general method, but that for certain specific functions M and N, there may be methods that provide better performance than the general method which will now be presented.

If the equation (1) is written in the components $(a_1, \ldots, a_n)$ and $(b_1, \ldots, b_n)$ of a and b (c. through d. in a base of $F_qn$), n equations with the following form are obtained:

$$\Sigma\gamma_{ijk}a_i a_j b_k=\Sigma\mu_{ij}a_i a_j=0 \qquad (2)$$

where $\gamma_{ijk}$ and $\mu_{ij}$ are coefficients of K. This is due to the fact that the functions which associate $x\hat{}(q^\theta)$ with x, and which associate $x\hat{}(q^\phi)$ with x, are linear functions of $F_qn$, therefore the functions which associate $x\hat{}(q^\theta+q^\phi)$ with x, and which associate $x\hat{}(q^\zeta+q^\xi)$ with x, are given in a base by polynomials with a total degree of 2.

Then, when a is given, n equations with a degree of 1 in the values $b_i$ are obtained from the n equations (2). Therefore, it is easy to find the solutions to these equations by Gauss reduction. It is assumed that at least one solution b such that $M(b) \neq 0$ or $N(b) \neq 0$ will be found. If more than one solution is found, one of the solutions for b is chosen at random.

3) Finally, $b=(b_1, \ldots, b_n)$ is transformed into $y=(y_1, \ldots, y_n)$ by applying to b a second secret affine bijective transformation t such that $y=t(b)$.

All of these operations being invertible, it is therefore possible to calculate $(x_1, \ldots, x_n)$ from $(y_1, \ldots, y_n)$ if one knows the secrets t and s. For example, if $M(b) \neq 0$, then a will be found from b by means of: $a=(N(b)/M(b))^{h'}$, where h' is the inverse of:

$$h=q^\theta+q^\phi-q^\zeta-q^\xi \text{ modulo } q^n-1.$$

Public calculation of $(y_1, \ldots, y_n)$ from $(x_1, \ldots, x_n)$:

The n equations (2) will be transformed into a system of n equations with the following form:

$$\Sigma \alpha_{ijk} x_i y_j y_k + \Sigma \beta_{ij} x_i x_j + \Sigma \nu_{ij} x_i y_j + \Sigma \epsilon_i x_i + \Sigma \zeta_i y_i + \delta_0 = 0 \quad (3)$$

that is, n equations $P_i(x_1, \ldots, x_n, y_1, \ldots, y_n) = 0$, $i = 1 \ldots n$, where $P_i$ is a polynomial of $K^{2n}$ to $K$ with a total degree of 3.

These n equations (3) will be public. They constitute the public key. By using these equations (3), and by Gauss reduction, it is possible to calculate all the solutions $(y_1, \ldots, y_n)$ from $(x_1, \ldots, x_n)$ without any secrets.

These n equations (3) are obtained from the n equations (2) in the following two steps:

Step 1: The variables $b_i$ are replaced by their affine expressions in the variables $y_j$ and the variables $a_i$ are replaced by their affine expressions in the variables $x_j$.

Step 2: Then, a secret affine bijective transformation is applied to these equations.

2.4 An example in signature with $m \neq n$.

The following is example that can be used in signature, with $m \neq n$.

As usual, let $y = (y_1, y_2, \ldots, y_m)$ notate a hash of the message to be signed (or the message to be signed).

Let $Q_1, \ldots, Q_n$ and $Q'_1, \ldots, Q'_n$ be 2n secret multivariable polynomials with a total degree of 2 of $K^n \to K$.

Let $b = t^{-1}(y)$, where $t$ is a secret affine bijection of $K^m \to K^m$; $b = (b_1, b_2, \ldots, b_m)$ Let B notate the element of $K^n$ whose components are:

$$B = (Q_1(b_1, b_2, \ldots, b_m), Q_2(b_1, b_2, \ldots, b_m), \ldots, Q_n(b_1, b_2 \ldots, b_m)).$$

And let B' notate the element of $K^n$ whose components are:

$$B' = (Q'_1(b_1, b_2, \ldots, b_m), Q'_2(b_1, b_2, \ldots, b_n), \ldots, Q'_n(b_1, b_2 \ldots, b_m)).$$

It is possible to consider B and B' as representing (in a base) two elements of the field $F_{q^n}$.

In this field, let $a$ be the element such that:

$$B \cdot a^{q^{\theta}+q^{\phi}} = B' \cdot a^{q^{\theta'}+q^{\phi'}} \quad (3)$$

$a$ is represented in a base by $a = (a_1, \ldots, a_n)$.

Finally, let $x = s(a)$, where $s$ is a secret affine bijection of $K^n \to K^n$.

$x = (x_1, \ldots, x_n)$ in a base.

By writing the equation (3) in a base, and by writing the equations in the variables $x_i$ and $y_j$, n equations with a total degree of 4 in the variables $x_1, \ldots, x_n, y_1, \ldots, y_m$ are obtained.

These n equations will be public and, $(x_1, \ldots, x_n)$ will be a valid signature of $(y_1, \ldots, y_m)$ if and only if all of these n equations are verified.

In order to calculate a signature with the secrets, one need only calculate b, then B and B', and then a from (3), and finally x using $x = s(a)$.

2.5 More general examples of Dragons, with a "non-monomial polynomial" transformation.

The same notations as before will be retained. In encryption, x still designates the unencrypted message and y designates the encrypted message (in signature, x is the signature and y is a public transformation of the message to be signed, for example y is Hash(M), where Hash is a hash function).

Let $a = s(x)$ still designate the transformation of x by a secret affine bijection s, and let b designate the transformation of y by a secret affine transformation $(y = t(b))$. $a$ is considered to be an element of the field $K_1$ with $q^n$ elements $(K1 = F_{q^n})$ and b is considered to be an element of the field $K_2$ with $q^m$ elements $(K2 = F_{q^m})$.

An example in which the passage from $a$ to b is slightly more general than before will now be presented.

Let k and k' be two integers, and let $N_i$, $1 <= i <= k$, and $N'_i$, $1 <= i <= k'$ be secret affine functions of $K_2$ to $K_1$ (as before, "affine" means that these functions are affine when $K_2$ and $K_1$ are considered to be vectorial spaces in the field K with q elements); moreover, the symbol $(<=)$ means "less than or equal to".

Finally, for any element $a$ of $K_1$ and any element b of $K_2$ let $f(a,b) = \Sigma \alpha_i a^{(q^{\beta_i} + q^{\gamma_i})} \cdot N_i(b) + \Sigma \alpha'_i a^{(q^{\beta'_i})} \cdot N i'(b) + \delta_0$, where, in the first sum $\Sigma$, the subscript i varies from 1 to k, and in the second sum $\Sigma$ the subscript i varies from 1 to k'.

Let d be the degree in a of this polynomial. There are known algorithms for finding the solutions a of the equation $f(a,b) = 0$ when d is not too large (say $d <= 9,000$) for example. Moreover, $f(a,b)$ was constructed so as to be expressed in a base in the form of polynomial equations with a total degree of 3 (a total degree of 2 in the variables $a_i$, and of 1 in the variables $b_j$). As before, these equations will be written by replacing the variables $a_i$ with their affine expressions in the variables $x_j$ and by replacing the variables $b_j$ with their affine expressions in the variables $y_j$. Then, a secret affine bijective transformation u is carried out on the system of equations obtained and the system thus obtained is made public: it is the public key. This public key is therefore constituted by equations with a total degree of 3 (a total degree of 2 in the variables $x_i$ and of 1 in the variables $y_i$). From these public equations, it is possible to calculate the solutions $y_i$ corresponding to a given x by Gauss reduction. On the other hand, the inverse operation (calculating x from y) requires the knowledge of secrets.

2.6 "Incomplete Dragons".

In all the examples of "Dragon" algorithms in encryption given, if redundancy is introduced into the message x, the redundancy algorithm being public, it is therefore possible not to publish all of the equations that were public equations, that is, to keep a small number of them secret. This can, in effect, reinforce the solidity of the algorithm. The correct value of x will then be found due to the public redundancy.

Likewise, in signature, it is possible not to publish all of the equations which were previously called public equations: the signature verification will then be carried out with fewer equations.

It is possible to envision other examples of "Dragon" algorithms. It is crucial, however, to be aware of the fact that certain variants are cryptographically weak: in the article "Asymmetric Cryptography with a Hidden Monomial" (LNCS 1109 Crypto '96, Springer, pages 45 through 60), the author presented some attacks on certain weak variants.

3. "Chain" Algorithms 3.1 The basic idea of "chains".

The basic idea of the "chains," as compared to MATSUMOTO-IMAI, is to introduce intermediate variables $z_i$, $1 \leq i \leq k$, that is, to have public polynomials $P_i$ which depend not only on the usual variables $x_i$ and $y_i$ (where the $x_i$s represent the message to be encrypted and the $y_i$s represent the encrypted message in encryption, or where the $x_i$s represent the signature of the $y_i$s in signature) but also on the intermediate variables $z_i$.

3.2 First example: "Small Chains".

To begin with, some first, fairly simple examples of "Chain Algorithms" will be presented. These examples clearly illustrate the concept of Chain Algorithms, but unfortunately these first exemplary algorithms are not very cryptographically secure. In effect, it is possible to generalize certain attacks from the article "Asymmetric Cryptography with a Hidden Monomial" (LNCS 1109, Crypto '96, Springer, pages 45 through 60) to these examples. Then, in paragraph 3.5, other examples of Chain Algorithms, for which no general attack is presently known, will be shown.

For example, let a, b, c, d be four elements of the field with $q^n$ elements and let four integers $\theta$, $\phi$, $\alpha$ and $\beta$ be such that:

$$c = a^{1+q^\theta} \quad (1)$$

$$d = a^{1+q^\phi} \quad (2)$$

and $$b = c^{q^\alpha} \times d^{q^\beta} \quad (3)$$

therefore $b = a^h$ where $h = q^\alpha + q^{\alpha+\theta} + q^\beta + q^{\beta+\phi}$. It is assumed that $\theta$, $\phi$, $\alpha$ and $\beta$ have been chosen such that h is prime with respect to $q^n - 1$.

Next, let it be assumed that $x = s(a)$ and $y = t(b)$, where s and t are secret affine bijective functions. And let $z = u(c)$ and $z' = v(d)$, where u and v are secret affine functions.

From (1), it is deduced that there are n relations with the form:

$$z_i = \Sigma\Sigma \gamma_{ij} \cdot x_i \cdot x_j + \Sigma \alpha_i \cdot x_i + \delta_0 \quad (1')$$

Likewise, from (2) it is deduced that there are n relations with the form:

$$z'_i = \Sigma\Sigma \gamma'_{ij} \cdot x_i \cdot x_j + \Sigma \alpha'_i \cdot x_i + \delta'_0 \quad (2')$$

Likewise, from (3) it is deduced that there are n relations with the form:

$$y_i = \Sigma\Sigma \gamma''_{ij} \cdot z_i \cdot z'_i + \Sigma \alpha''_i \cdot z_i + \Sigma \beta''_i \cdot z'_i + \delta''_0 \quad (3')$$

Next, let it be assumed that the 3×n equations (1'), (2') and (3') are public. Therefore, if x is the message to be encrypted, the $z_i$s will be obtained from (1'), the $z'_i$s will be obtained from (2'), then the $y_i$s will be obtained from (3'). Thus, it is possible to calculate the encrypted y from x and from the public polynomials.

On the other hand, if y is known but x is unknown, it would seem that it is not always possible to get back to x from y. In effect, from (3'), it is only possible to get back to n equations for 2×n variables $z_i$ and $z'_i$, and therefore the $z_i$s and the $z'_i$s remain unknown.

On the other hand, if the secret keys s and t are known, it is possible to calculate $b = t^{-1}(y)$ from y, then $a = b^{h'}$, where h' is the inverse of h modulo $q^n - 1$, then finally $x = s(a)$. Thus, with the secret key, it is possible to decrypt the messages.

3.3. Second example: small chains with Dragon.

The same notations as in the preceding paragraph will be retained, but it will now be assumed that:

$$c = a^{q^\theta + q^\phi - 1} \quad (1),$$

$$d = a^{q^{\theta'} + q^{\phi'} - 1} \quad (2),$$

and $$c^{q^\alpha} \times b = d^{q^\beta} \times b^{q^\gamma} \quad (3)$$

where $\theta$, $\phi$, $\theta'$, $\phi'$, $\alpha$, $\beta$ and $\gamma$ are integers. Therefore, likewise, $b = a^\mu$ for a particular $\mu$ and $\theta$, $\phi$, $\alpha$, $\theta'$, $\phi'$, $\alpha$, $\beta$ and $\gamma$ will be chosen such that $\mu$ is prime with respect to $q^n - 1$. The algorithm will work in exactly the same way, but this time the public equations (1') are in the form:

$$\Sigma\Sigma \gamma_{ij} \cdot z_i \cdot x_j + \Sigma\Sigma \gamma'_{ij} \cdot x_i \cdot x_j + \Sigma \alpha_i \cdot x_i + \Sigma \beta_i z_i + \delta_0 = 0 \quad (1')$$

and the public equations (2') are in the form:

$$\Sigma\Sigma \mu_{ij} \cdot z'_i \cdot x_j + \Sigma\Sigma \mu'_{ij} \cdot x_i \cdot x_j + \Sigma \alpha'_i \cdot x_i \Sigma \beta'_i \cdot z'_i + \delta'_0 = 0 \quad (2')$$

If x is the message to be encrypted, the $z_i$s will be obtained by GAUSS reduction from (1'), the $z'_i$s will be obtained by GAUSS reduction from (2'), and the $y_i$s will be obtained from (3').

3.4 Utilization of chains in signature.

The examples in paragraphs 3.2 and 3.3, given for encryption, can also be used in signature. In this case, x represents the signature associated with y, and the signature verification consists of verifying whether variables $z_i$ and $z'_i$ that satisfy (1'), (2') and (3') actually exist.

3.5 More general chains.

In a public key, in the examples in paragraphs 3.2 and 3.3, the intermediate variables z and z' were obtained from x, then y was obtained from z and z'. It is possible to envision longer chains.

For example, from the $x_i$s, it is possible to obtain variables $z_i$. Then, from the variables $x_i$ and $z_i$, it is possible to obtain variables $z'_i$. Next, from the variables $x_i$, $z_i$ and $z'_i$, the variables $z''_i$ would be obtained. Then finally, from the variables $x_i$, $z_i$, $z'_i$ and $z''_i$, ..., y would be obtained.

An example of this more general type of chain, for which no attack is known, will now be presented.

Notations.

x is the unencrypted text, y is the encrypted text, s and t are two secret affine functions, $b = t(y)$, $a = s(x)$, k is an integer (this is the number of "links" of the chain), a, b, $L_1$, $L_2$, ... $L_k$, $M_1$, $M_2$, ... $M_k$ are elements of $F_2^n$, $s_1$, ..., $s_k$, $t_1$, ... $t_k$ are 2k secret affine bijections, for any subscript i such that $1 \leq i \leq k$: $l_i = s_i(L_i)$, and $m_i = t_i(M_i)$.

Comment.

x, y, $l_1$, ... $l_k$, $m_1$, ... $m_k$ are the values which will occur in the public equations and a, b, $L_1$, $L_2$ ... $L_k$, $M_1$, ... $M_k$ are the values that are accessible with the secrets.

For all subscripts i, $1 \leq i \leq k$, there are two exponents $h_i$ and $h'_i$ such that: $L_i = a^{h_i}$ and $M_i = a^{h'_i}$ (further details on $h_i$ and $h'_i$ are given below), and there is an exponent h such that: $b = a^h$.

Thus, in this example, the secret key calculations will be easy:

1. Calculate $b = t(y)$,
2. Calculate $a = b^{h'}$ where $hh' = 1$ modulo $2n-1$,
3. Finally, calculate $x = s^{-1}(a)$.

The equations that are public will now be described. There are two types of them: there are the "link" type equations (of which there are 2k.n), which make it possible to go from x to $l_1$ or from x to $m_1$ or from $l_i$ to $l_{i+1}$ or from $m_i$ to $m_{i+1}$, and there are the n final public equations, which make it possible to go from ($l_k$, $m_k$) to y.

The equations of the "link" type.

Take the way in which one gets from x to $l_1$ as an example; in effect, it is the same for the other "links", that is, for getting from $l_i$ to $l_{i+1}$, or from x to $m_1$, or from $m_i$ to $m_{i+1}$, $1 \leq i \leq k-1$.

There are four secret integers, which are notated $\alpha$, $\beta$, $\gamma$, $\delta$, such that:

$$a^{2^\alpha} \cdot L_1^{2^\beta} = a^{2^\gamma} \cdot L_1^{2^\delta} \quad (C1)$$

Furthermore, $\alpha$, $\beta$, $\gamma$, $\delta$ are chosen such that: HCD($2\gamma - 2^\alpha$, $2^n - 1$) = 1 and HCD($2^\delta - 2^\beta$, $2^n - 1$) = 1 (which makes it possible to have bijective transformations). It will be recalled that HCD means "Highest Common Denominator."

When (C1) is written in a base with the components $x_i$ of the variable x and the variables $l_1$, i of the variable $l_1$, n equations with the following form are obtained:

$$\Sigma \gamma_{ij} x_i l_{1,j} + \Sigma \xi_i x_i + \Sigma \psi_i l_{1,i} + \mu_0 = 0 \quad (C2).$$

These n equations (C2) are public (or, more precisely, a linear bijective transformation of these equations is made public).

From these equations (C2) it is possible, without any secrets, to calculate $l_1$ from x, by performing Gauss reductions.

Likewise, it is possible to calculate $l_2$ from $l_1$, then $l_3$ from $L_2$, etc., up to $l_k$ from $l_{k-1}$, and therefore it is possible to calculate $l_k$ from x. Likewise, it is possible to calculate $m_k$ from x. It is therefore possible to calculate $l_k$ and $m_k$ from x by means of the 2k.n public equations.

The final public equations.

The n "final" public equations will then make it possible to calculate y from $m_k$ and $l_k$. (In this case, the calculation is "one-way", which means that without secrets, it will not be possible to know how to get back to $m_k$ and $l_k$ from y). Here are two typical examples of possible final equations.

EXAMPLE 1

$$b^{2^{\alpha'}} . L_k^{2^{\beta'}} = b^{2^{\alpha''}} . M_k^{2^{\beta''}}, \quad (C3)$$

where $\alpha'$, $\beta'$, $\alpha''$ and $\beta''$ are secret integers.

EXAMPLE 2

$$b . M_k = L_k^{2^\theta + 2^\phi} \quad (C4)$$

where $\theta$ and $\phi$ are secret integers.

This equation ((C3) or (C4)) is written in a base with the variables $y_i$, $m_{k,i}$ and $l_{k,i}$. Thus, n equations are obtained. A linear and bijective transformation of these n equations is made public, which makes it possible to calculate y from $l_k$ and $m_k$ (by Gauss reduction).

Thus, it will be possible, from public equations, to calculate y from x, as desired.

4. A Method for Reducing the Size of the Public Keys.

The secret affine functions s and t which occur in the Dragon and Chain algorithms are coefficients with value in the same ring A as the variables which occur. However, it is sometimes advantageous to limit oneself to coefficients in a sub-ring A' of A, since in that case the public polynomials could themselves have coefficients in a sub-ring A" of A, making it possible to reduce the number of bits required for the description of these public polynomials. This technique is particularly appropriate for the examples given above.

5. One Way Not to Store the Polynomials $P_i$

In a chip card capable of calculating the values (y) from (x), and possibly (x) from (y), it is not always necessary for the card to store all the public polynomials $P_i$. In effect, since these polynomials have a low total degree, the card could supply values (x), and (y) corresponding to (x), from which it is possible to recalculate the public polynomials $P_i$ from outside. More generally, it could supply values which make it possible to recalculate the public polynomials $P_i$, which values may be signed, or which public polynomials to be found may be signed, and which signature (and not all the public polynomials) would be stored in the card.

6. Encryption/Decryption System Using the Process of the Invention

Figure 2:
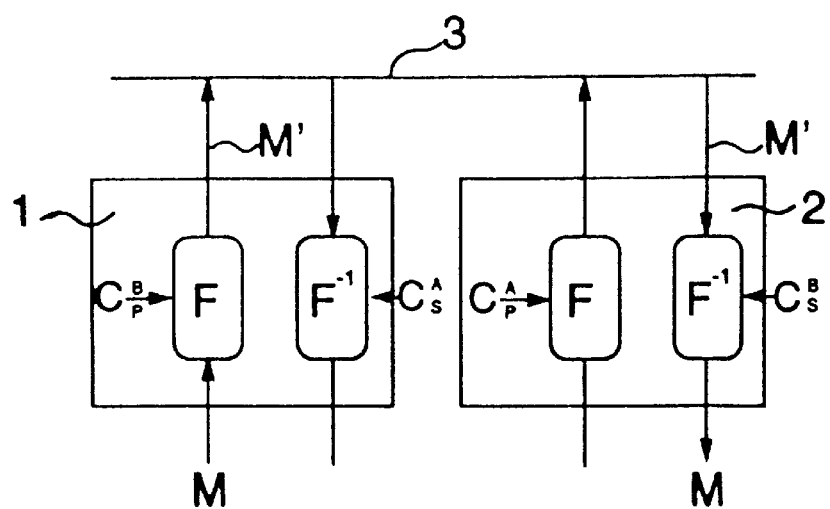
FIG. 2 illustrates an exemplary encryption/decryption system using the cryptographic communication process according to the invention.

FIG. 2 schematically illustrates an example of a known encryption/decryption system using the cryptographic communication process described above.

Say there are two individuals A and B connected to the same communication network, each of whom has a respective message sending/receiving device 1, 2. This device includes calculation means, for example a computer, designed to carry out the encryption/decryption of messages, and storage means. At least part of these calculation or storage means can be located in a portable object incorporating a microprocessor or micro-wired logical circuits which define areas to which access is controlled, and can therefore contain secret information such as cryptographic keys (see for example the portable object described in U.S. Pat. No. 4,211,919).

Each device incorporates an algorithm F as described above, specifically in the form of a program, as well as the inverse algorithm $F^{-1}$. The two devices are connected to one another by means of a communication line 3.

Both individuals A and B, respectively, have a pair of keys: a public key $Cp^A$ and $Cp^B$, and a secret key $Cs^A$ and $Cs^B$ correlated to the corresponding public key $Cp^A$ or $Cp^B$.

The individual A sends B his public key $Cp^A$ and possibly a signature of this public key, and B sends A his public key $Cp^B$ and possibly a signature of this public key. Once A has received the public key $Cp^B$, he will use it, along with the cryptographic algorithm F, to encrypt a message M that he wishes to send to B, and a message M'. This message, once received by B, is decrypted using the cryptographic algorithm $F^{-1}$ and the secret key $Cs^B$.

What is claimed is:

1. An asymmetric cryptographic communication process for establishing a cryptographic correspondence between a first communication element called a first value (x) and a second communication element called a second value (y), comprising:

establishing a correspondence between said first value (x) represented by n elements $(x_1, \ldots, x_n)$ of a ring (A) and said second value (y) represented by m elements $(y_1, \ldots, y_m)$ of said ring, wherein n and m are integers having a value greater than or equal to 2.

establishing said correspondence between said first value (x) and said second value (y) is established by defining multivariable public polynomials $(P_i)$ of $A^{n+m+k} \to A$, with a total degree less than or equal to 6, such that equations of the type $P_i(x_1, \ldots, x_n; y_1, \ldots, y_m; z_1, \ldots, z_k) = 0$ can be satisfied where $(z_1, \ldots, z_k)$ are possible intermediate variables and k is an integer; wherein at least some of the polynomials $(P_i)$ are not of a form $T_i(y_1, \ldots, y_m) = S_i(x_1, \ldots, x_n)$, in which $S_i$ is a polynomial with a total degree of two, and in which $T_i$ is a polynomial with a total degree of one, so that said established correspondence enables communication between said first and second communication elements.

2. A process according to claim 1, wherein at least some of the polynomials $(P_i)$ are not of the form $T_i(y_1, \ldots, y_m) = S_i(x_1, \ldots x_n)$, in which the $S_i$s are polynomials with a total degree less than or equal to 6 and in which the $T_i$s are polynomials with a total degree of 1.

3. A process according to claim 1, wherein the multivariable public polynomials $(P_i)$ have the form $P_i(x_1, \ldots, x_n; y_i, \ldots, y_m) = 0$, and wherein at least some polynomials are of a form such that there is an integer j between 1 and n, and an integer p between 1 and m, such that said polynomials $(P_i)$ contain at least one non-null monomial in $x_j . y_p$.

4. A process according to claim 3, in which said correspondence between the first value (x) and the second value (y) is defined by the following steps:
   1) calculating a function y=F(x) using the knowledge of a first secret affine transformation s and a second secret affine transformation t, s being an affine transformation of $A^n \rightarrow A^n$, that is, determined by n polynomials with a total degree of 1 in n variables, and t being an affine transformation of $A^m \rightarrow A^m$, that is, determined by m polynomials with a total degree of 1 in m variables, said function y=F(x) being calculated in the following way:
      a) applying the affine transformation s to x, and obtaining an image: a=s(x)
      b) applying a transformation f to the image (a), resulting in an image b such that: b=f(a), wherein: if a=($a_1$, $a_2$, ..., $a_i$, ..., $a_n$) and b=($b_1$, $b_2$, ... $b_j$, ..., $b_m$), $a_i$ and $b_j$ being elements of A, there is a correspondence defined by multivariable public polynomials ($V_i$) of $A^{n+m} \rightarrow A$, which are non-null and have a low total degree, each of which satisfies an equation of the type:

$$V_i(a_1, a_2, \ldots, a_i, \ldots, a_n; b_1, b_2, \ldots, b_j, \ldots, b_m)=0 \quad (I)$$

at least some polynomials ($V_i$) being such that there is an integer j between 1 and n, and an integer p between 1 and m, such that said polynomials ($V_i$) contain at least one non-null monomial in $a_j \cdot b_p$; and selecting the transformation f such that there is an algorithm which makes it possible, for many images b, to calculate at least one image (a) such that: f(a)=b;
      c) applying the affine transformation t to the image b, and obtaining t(b)=y;
   2) deducing, from the existence of the equations (I), the existence of equations (II), by changing variables, said equations (II) defining said multivariable polynomials ($P_i$):

$$P_i(x_1, x_2, \ldots, x_n; y_1, y_2, \ldots, y_m)=0 \quad (II)$$

wherein at least some of said polynomials are public.

5. A process according to claim 1, wherein the multivariable public polynomials ($P_i$) comprise defined polynomials ($Q_j$) of $A^{n+k} \rightarrow A$ in the form $Q_j(x_i, \ldots, x_n; z_1, \ldots, z_k)=0$, and defined polynomials ($R_p$) of $A^{m+k'} \rightarrow A$ in the form $R_j(y_1, \ldots, y_m; z'_1, \ldots, z'_{k'})=0$, where ($z_1, \ldots, z_k$) and ($z'_1, \ldots, z'_{k'}$) are intermediate variables that are positively present, and j, p, k and k' are integers.

6. A process according to claim 1, further comprising calculating a message signature, said message signature including the second value y=($y_1, \ldots, y_m$) representing a message to be signed or a function of the message to be signed, and the first value x=($x_1, \ldots, x_n$) representing a signature of the message, which process comprises verifying said message signature by verifying that said equations on the polynomials ($P_i$) have in fact been satisfied, wherein, when variables $z_1, \ldots, z_k$ occur in said equations, said process includes a further step of verifying whether variables of this type ($z_1, \ldots, z_k$) that will satisfy all of said equations actually exist.

7. A process according to claim 1 further comprising encrypting a message, in which a first value x=($x_1, \ldots, x_n$) represents the message to be encrypted and in which a second value y=($y_1, \ldots, y_m$) represents the encrypted message, which process comprises applying said correspondence with the first value x in order to obtain, for at least some of the values x, a second value y, using a set of public keys which include said multivariable public polynomials ($P_i$).

8. A process according to claim 1, further comprising executing an asymmetric authentication, by a first person called a verifier, of another person called a prover, the process further comprising:
   sending, from the verifier to the prover, a value constituted by the second value (y);
   returning, from the prover to the verifier, a value constituted by the first value (x);
   said verifier then verifying that said equations on the polynomials ($P_i$) are in fact compatible with the first (x) and second (y) values, wherein, when the variables $z_1, \ldots, z_k$ occur in said equations, said process includes the further step of verifying whether variables of this type ($z_1, \ldots, z_k$) that will satisfy all of said equations actually exist.

9. A process according to claim 1, wherein:
   the correspondence includes at least one secret affine transformation s defined by a matrix composed of coefficients with value in said ring (A), and
   said coefficients of the matrix have value in a sub-ring (A') of (A) such that said multivariable public polynomials ($P_i$) have coefficients with value in a sub ring (A") of (A).

10. A process according to claim 1, wherein each monomial of said multivariable public polynomials ($P_i$) contains at least one variable $y_j$, and wherein a total degree in the variables $y_j$ of the polynomials ($P_i$) is 0 or 1.

11. A process according to claim 1, wherein:
   A is a finite field K having a small number of elements notated q=|K|;
   m=n;
   a and b represent two values of two elements of the field $Fq^n$ with $q^n$ elements;
   the transformation f is a bijection of the form $f(a)=b=a^h$, where h is a public or secret integer and is prime with respect to $q^n-1$.

12. A portable object for establishing a cryptographic correspondence between a first communication element called a first value (x) and a second communication element called a second value (y), comprising
   information processing means, and
   storage means, said information processing means and storage means interconnected and arranged to carry out an asymmetric cryptographic communication which establishes a correspondence between said first value (x) represented by n elements ($x_1, \ldots, x_n$) of a ring (A) and said second value (y) represented by m elements ($y_i, \ldots, y_j \ldots, y_m$) of said ring, n and m being integers greater than or equal to 2 wherein:
   said correspondence is defined by multivariable public polynomials ($P_i$) of $A^{n+m+k} \rightarrow A$, with a total degree less than or equal to 6, such that $P_i(x_1, \ldots, x_n; y_1, \ldots, y_m; z_1, \ldots, z_k)=0$, where ($z_1, \ldots, z_k$) are possible intermediate variables and k is an integer;
   at least some of the polynomials ($P_i$) are not of a form $T_i(y_1, \ldots, y_m)=S_i(x_1, \ldots, x_n)$, in which $S_i$ is a polynomial with a total degree of 2 and in which $T_i$ is a polynomial with a total degree of 1;
   wherein said storage means does not store the multivariable public polynomials ($P_i$);
   and wherein the portable object is so constructed and arranged to supply, to an external device, only the data that makes it possible to calculate, from outside the portable object, the multivariable public polynomials ($P_i$), by means of which the second value (y) can be calculated from the first value (x), so that said established correspondence enables communication between said first and second communication elements.

* * * * *

UNITED STATES PATENT AND TRADEMARK OFFICE
CERTIFICATE OF CORRECTION

PATENT NO.: 6,111,952
DATED: August 29, 2000
INVENTOR(S): PATARIN

It is certified that error appears in the above-identified patent and that said Letters Patent are hereby corrected as shown below:

<u>IN THE CLAIMS</u>:

Claim 3, line 64, "$Y_i$" should be --$Y_1$--

Claim 5, line 41, "$X_i$" should be --$X_1$--

Claim 12, line 46, "$Y_i$" should be --$Y_1$--

Signed and Sealed this

Fifteenth Day of May, 2001

Attest:

NICHOLAS P. GODICI

Attesting Officer     *Acting Director of the United States Patent and Trademark Office*